GILES & FERRY.
Potato Digger.
No. 84,741.  Patented Dec. 8, 1868.
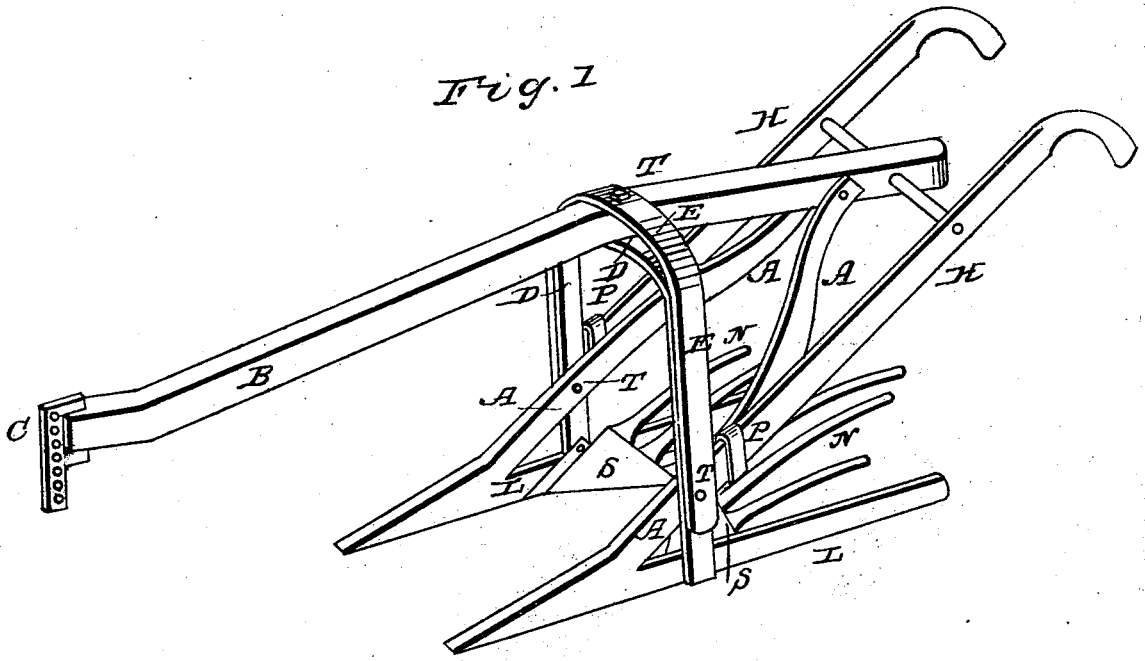
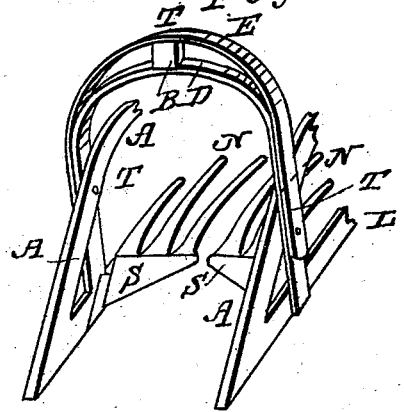

UNITED STATES PATENT OFFICE.

JOEL E. GILES AND WILLARD FERRY, OF MEAD'S MILLS, MICHIGAN.

Letters Patent No. 84,741, dated December 8, 1868.

IMPROVEMENT IN POTATO-DIGGERS.

The Schedule referred to in these Letters Patent and making part of the same

*To all whom it may concern:*

Be it known that we, JOEL E. GILES and WILLARD FERRY, of Mead's Mills, in the county of Wayne, and in the State of Michigan, have invented an Improved Potato-Digger; and do hereby declare that the following is a full, clear, and exact description thereof, reference being had to the accompanying drawings, making a part of this specification, in which—

Figure 1 is a perspective view of the digger.

Figure 2 is a detached view showing the arrangement of the landsides, shares, and tines.

Letters of like name and kind refer to like parts in each of the figures.

Our invention relates to a class of devices known as "potato-diggers;" and

It consists, first, in such an arrangement of the landsides as shall gather up and close in the vines before the hills are disturbed by the shares; second, in so arranging and combining two shares as that the hill shall be enclosed between said shares, and also, in inclining their front edges towards the centre and rear, at an angle of forty-five degrees, or thereabouts, and leaving a space between their inner points, so as to allow the roots, which would otherwise double over the edges of the shares, to slide off and pass between without catching; third, in arranging the tines, attached at the rear of the shares, in a double curve, so as to more effectually separate the potatoes from the soil; fourth, in the construction and arrangement of a brace attached to the outside of the landsides, and carried upward and around the beam, so as to entirely clear the vines and hill, while preventing said landsides from being crowded apart; fifth, in the means employed to strengthen and support the landsides.

In the annexed drawings—

L L represent two landsides of ordinary construction, arranged parallel to each other, and twenty-four inches apart, or thereabouts.

Extending upwards and backwards from the landsides L L, and forming a part thereof, are two braces, A A, which are brought towards the centre at their upper ends, and secured to opposite sides of the beam B by means of a bolt passing through both braces and beam.

Attached to the outer side of each landside, midway between its front and rear end, is one end of a bow, D, which extends upwards and across in a curve beneath the beam B, and is secured in a similar manner to the opposite landside, for the purpose of supporting said beam, and preserving the relative distance between said landsides.

This bow is strengthened by a brace, E, which passes over the beam, and is bolted to the bow D at T, the whole forming a trestle brace which effectually holds the landsides in place, and prevents them from being spread by the pressure of the earth.

Two handles, H H, of the usual form and construction, are bolted to the braces A A, and secured to the rear end of the beam B by a round passing through both handles and beam.

S S represent two shares secured by bolts to the inner side of the landsides L L, about two-thirds of the distance from the front to the rear. The faces of said shares are inclined upward at the usual angle, and their front or lower edges recede to the rear at a suitable angle (about forty-five degrees,) so as to allow the roots to slide off instead of adhering to said edges. A suitable opening is left between the inner points of the shares, to permit the passage of the roots.

Immediately in the rear of and extending upwards and backwards from the shares S S, are six or more tines, N N, from twelve to sixteen inches in length, the front edges of which are arranged in a V-shaped line conforming to the rear edges of the shares, so that the inner tines are the lowest, while their rear ends are arranged in a curved line highest in the centre, from which they slope downwards to either side.

The operation of this device is as follows, viz:

The digger is placed so as to straddle a row of hills, one landside running in each of the hollows upon the sides, and about two inches beneath the surface of the ground. The vines are gathered up and turned together by the action of the landsides L L and braces A A before the shares enter the hill, so as to pass through without clogging. The hill is now lifted upward by the shares, pulverizing the soil and liberating the potatoes, both of which pass over said shares and tines, the latter of which separate the potatoes from the soil, allowing the soil to drop between the tines, while the potatoes pass over and are deposited in the rear upon the top of the ground.

The arrangement of the tines, by which their upper surface is concave at their front ends and convex at their rear ends, greatly facilitates the separation of the potatoes from the soil, as the latter, when near the rear end of said tines, has a tendency to roll off at the sides as well as fall through the tines, while the potatoes are held together by their roots, and drop squarely in the rear.

The advantages possessed by this device over all others intended for a like purpose, are—

First. The vines are gathered up and thrown together, rendering it more easy for the picker to grasp them in raising the potatoes from the ground.

Second. The construction and arrangement of the shares are such that it is impossible for the machine to become clogged by the lodging of vines, roots, or weeds.

Third. By the arrangement of the shares and tines, the ground is thoroughly pulverized and levelled, a part of the hill being thrown to each side, and the balance carried forward, so as to leave the surface in a good condition for another crop.

Fourth. While performing the work more thoroughly, the machine is more simple in construction, and can be furnished at a less cost than any other capable of producing a like result.

Having thus fully set forth the nature and merits of our invention,

What we claim as new, and desire to secure by Letters Patent, is—

Arranging the shares S S on the landsides in such a position that the landsides will gather the vines together before the shares enter the hill, substantially as shown and described, and for the purpose set forth.

Also, the construction and arrangement of the two shares S S, as shown and described, viz, by making their front edges recede to the rear, and leaving an opening there between them, when said shares are combined with the landsides, substantially as and for the purpose set forth.

Also, the arrangement of the tines N N, &c., in a double curve, as shown and described, and for the purpose set forth.

Also, the combination of the brace E (applied to prevent the spreading of the landsides) with the bow D, when said bow is arranged in position to prevent its engaging with the vines, substantially as and for the purpose set forth.

Also, the brace A, when arranged as shown and described, for the purpose set forth.

In testimony that we claim the foregoing, we have hereunto set our hands and seals, this 20th day of November, 1868.

JOEL E. GILES [L. S.]
    WILLARD FERRY. [L. S.]

Witnesses:
 W. D. WHALEN,
 SETH HUGHES.